March 4, 1924. 1,486,008
E. BOYCE
REAR SIGNAL MOUNTING
Filed Sept. 1, 1923  2 Sheets-Sheet 2
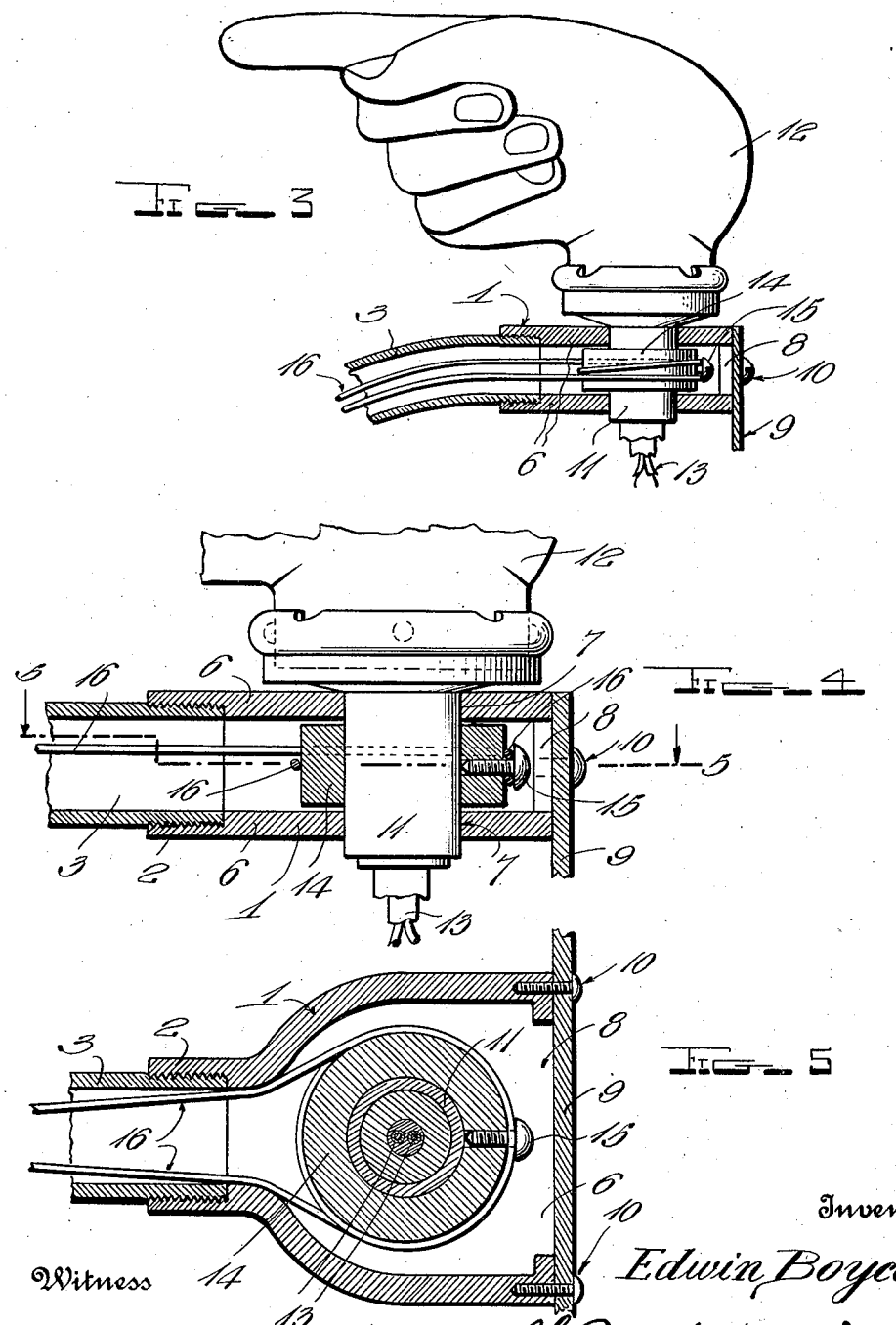
Inventor
Edwin Boyce Patented Mar. 4, 1924.

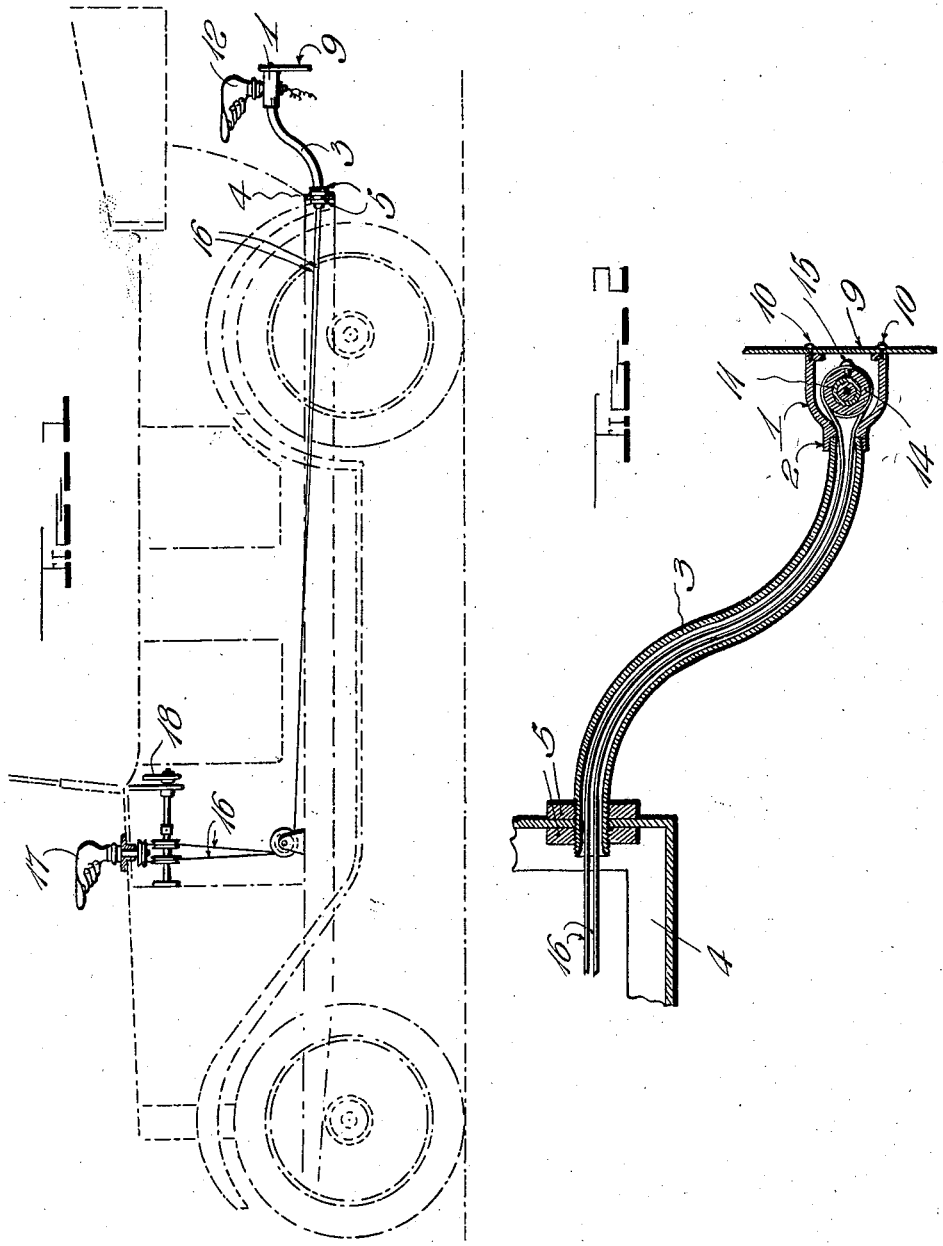

1,486,008

UNITED STATES PATENT OFFICE.

EDWIN BOYCE, OF PINE BLUFF, ARKANSAS.

REAR-SIGNAL MOUNTING.

Application filed September 1, 1923. Serial No. 660,631.

*To all whom it may concern:*

Be it known that I, EDWIN BOYCE, a citizen of United States, residing at Pine Bluff, in the county of Jefferson and State of Arkansas, have invented certain new and useful Improvements in Rear-Signal Mountings; and I do declare the following to be a full, clear, and exact description of the invention, such as will enable others skilled in the art to which it appertains to make and use the same.

My invention relates to improvements in signals for automobiles and other vehicles, adapted to indicate what direction is to be taken by the machine, and the present disclosure is directed more particularly to mounting and operating means for the shaft of a rear signal, the object being to provide an exceptionally simple and inexpensive, yet an efficient and desirable association of parts for obtaining the desired ends.

With the foregoing in view, the invention resides in the novel subject matter hereinafter described and claimed, the description being supplemented by the accompanying drawings.

Fig. 1 is a side elevation partly in section, of an automobile equipped with the invention and also with a front indicator which operates in conjunction therewith.

Fig. 2 is a small horizontal sectional view through the supporting body for the rear signal and shaft, and the tubular arm by means of which this body is connected with the chassis frame of the machine.

Fig. 3 is a side elevation of the rear signal and its shaft, the supporting body for these parts being shown in vertical section.

Fig. 4 is an enlarged view similar to Fig. 3, but showing additional parts in section.

Fig. 5 is a horizontal sectional view on line 5—5 of Fig. 4.

In the drawings above briefly described, the numeral 1 designates a hollow metal body which is preferably provided at its front end with a boss 2, into which the rear end of a supporting tube 3, is threaded, the front end of said tube being passed through an opening in the rear end of the chassis frame 4 of an automobile and being secured by a pair of nuts 5 or other preferred means.

The body 1 is provided with flat horizontal sides 6 having vertically aligned bearing openings 7, while the rear side of the body is provided with a relatively large rectangular opening 8. This opening however is normally closed by a license carrying plate 9 which may well be secured in place by screws 10, threaded into the body.

A vertical shaft 11, carrying a rear signal 12, passes rotatably through the openings 7, said signal being preferably in the form of a hollow globe of porcelain, glass or the like, to be illuminated by an electric bulb whose wiring 13 may well pass through the shaft 11. The signal preferably takes the form of a human hand with the index finger extended, and said signal may be connected with the shaft 11 in any preferred manner. As the preferred connecting means is protected by another application, it is not herein disclosed.

A collar 14, previously inserted into the hollow body 1, through the opening 8, is secured upon the shaft 11 by a set screw 15 or other desired means, and an operating cable 16 which passes through the tubular support 3, is wound around the collar 14 so that the latter constitutes a drum for rotating the shaft 11 and the indicator 12 to show what direction is to be taken by the machine. I prefer that the cable 16 shall be connected with the collar 14 by the screw 15, but it could be otherwise connected if desired. Furthermore, while it is not essential, I prefer that the cable 16 shall lead forwardly over suitable guides to operate a front signal 17, a suitable control 18, for moving the cable, being provided, for instance at the instrument board of the machine.

In assembling the device, the cable 16 is first looped and passed through the tube 3 and body 1, so that the loop extends out of the opening 8. This loop is then engaged with the collar 14 and the latter is drawn or moved into the body 1, in alignment with the openings 7. The shaft 11 is then inserted through said openings 7 and the collar, and the set screw 15 is tightened to secure the cable and secure the collar upon said shaft. This having been done, the license carrying plate 9 is secured in place over the opening 8 by the screws 10.

It will be seen from the foregoing that an exceptionally simple and inexpensive arrangement has been provided for properly mounting the signal and effecting the necessary turning thereof. As excellent results are obtainable from the details disclosed, they are preferably followed but within the scope of the invention as claimed numerous minor changes may be made.

I claim:—

1. A device of the class described comprising a hollow supporting body having a bearing opening in at least one horizontal side, a relatively large opening in one vertical side and a cable opening in another vertical side, a collar insertable into said body through said relatively large opening, a signal carrying shaft passing through said bearing opening and into said collar, means for securing said collar on said shaft to prevent removal of the latter from the body, and an operating cable passing through said cable opening and passed around said collar, whereby the latter functions also as a drum for rotating said shaft.

2. A structure as specified in claim 1; together with a license plate carrier secured to the body and forming a closure for said relatively large opening.

In testimony whereof I have hereunto set my hand in the presence of two subscribing witnesses.

EDWIN BOYCE.

Witnesses:
P. E. STECK,
C. Z. McCLEAN.